United States Patent
Tanaka et al.

(10) Patent No.: US 8,276,977 B2
(45) Date of Patent: Oct. 2, 2012

(54) AUTOMOBILE BODY STRUCTURE

(75) Inventors: Yukio Tanaka, Kariya (JP); Masayuki Taguchi, Kariya (JP); Yasunari Sakai, Kariya (JP); Masaru Morita, Kariya (JP); Natsuki Kotera, Kariya (JP); Akikazu Hashizume, Kariya (JP)

(73) Assignee: Toyota Shatai Kabushiki Kaisha, Aichi-ken (JP)

( * ) Notice: Subject to any disclaimer, the term of this patent is extended or adjusted under 35 U.S.C. 154(b) by 225 days.

(21) Appl. No.: 12/679,650

(22) PCT Filed: Sep. 30, 2008

(86) PCT No.: PCT/JP2008/067732
§ 371 (c)(1),
(2), (4) Date: Jun. 4, 2010

(87) PCT Pub. No.: WO2009/044729
PCT Pub. Date: Apr. 9, 2009

(65) Prior Publication Data
US 2010/0244485 A1    Sep. 30, 2010

(30) Foreign Application Priority Data

Oct. 2, 2007 (JP) .................................. 2007-258507
Sep. 16, 2008 (JP) .................................. 2008-236257

(51) Int. Cl.
*B60J 5/04* (2006.01)
(52) U.S. Cl. ............ 296/187.12; 296/193.02; 296/146.6
(58) Field of Classification Search ............ 296/187.12, 296/146.6, 193, 2
See application file for complete search history.

(56) References Cited

U.S. PATENT DOCUMENTS 6,568,745 B2 *  5/2003  Kosuge et al. ........... 296/193.02

FOREIGN PATENT DOCUMENTS

| JP | 09-095264 | 4/1997 |
| JP | 2006-248388 | 9/2006 |
| JP | 2007-022485 | 2/2007 |
| JP | 2007-062563 | 3/2007 |

* cited by examiner

*Primary Examiner* — Dennis Pedder
(74) *Attorney, Agent, or Firm* — Patterson Thuente Christensen Pedersen, P.A.

(57) ABSTRACT

It is an object of the present invention to prevent a vehicle door from protruding into a vehicle cabin when a collision load is applied to the door from a lateral side thereof, and to reduce costs that are required for measures to prevent the door from protruding into the vehicle cabin.

3 Claims, 10 Drawing Sheets

FIG. 12
PRIOR ART

AUTOMOBILE BODY STRUCTURE

PRIORITY CLAIM

The present application is a National Phase entry of PCT Application No. PCT/JP2008/067732, filed Sep. 30, 2008, which claims priority from Japanese Patent Application Number 2007-258507, filed Oct. 2, 2007, and Japanese Patent Application No. 2008-236257, filed Sep. 16, 2008, the disclosures of which are hereby incorporated by reference herein in their entirety.

TECHNICAL FIELD

The present invention relates to a vehicle body structure in which a collision load applied to one of vehicle doors from a lateral side thereof is received by a load receiving member of a body via an impact beam and a door box of the door and is transmitted from the load receiving member to a cross member.

BACKGROUND ART

Figure 12:
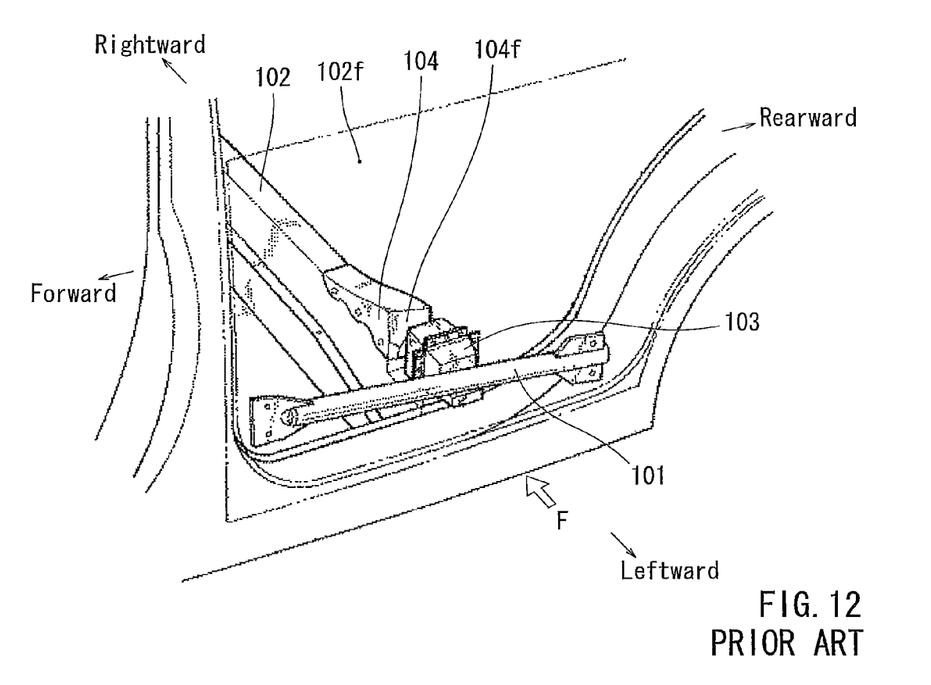
FIG. 12 is a perspective view of a conventional vehicle body structure.

A related conventional vehicle body structure is described in Japanese Laid-Open Patent Application No. 2007-22485. In the body structure described in Japanese Laid-Open Patent Application No. 2007-22485, as shown in FIG. 12, stepped load receiving members 104 are disposed on an upper surface of a cross member 102 constituting a vehicle cabin floor 102f and are secured to both side portions of the cross member 102 in a vehicle widthwise direction. Each of the load receiving members 104 is constructed to receive a load at an end surface 104f thereof. The end surface 104f is positioned opposite to a door box 103 of a rear door (not shown) in the vehicle widthwise direction. Therefore, when a collision load is applied to the vehicle rear door from a lateral side thereof, the collision load is transmitted to the end surface 104f of the load receiving member 104 via an impact beam 101 and the door box 103 of the rear door and is transmitted from the load receiving member 104 to the cross member 102. That is, the vehicle rear door can be supported by the load receiving member 104 and the cross member 102. Thus, the rear door can be prevented from protruding into a vehicle cabin.

DISCLOSURE OF THE INVENTION

Problem to be Solved by the Invention

In the body structure described above, the stepped load receiving members 104 are disposed on the upper surface of the cross member 102 and are secured to both side portions of the cross member 102 in the vehicle widthwise direction. Therefore, the collision load F that is transmitted to a body via the impact beam 101 and the door box 103 of, for example, the left rear door, can be concentrated to a left end portion of the cross member 102 to which the load receiving member 104 is secured. Therefore, it is necessary to reinforce the cross member 102 by, for example, thickening the same. As a result, costs required to reinforce the cross member 102 can be increased.

Further, because the load receiving members 104 are secured to both side portions of the cross member 102 in the vehicle widthwise direction, when, for example, the cross member 102 and the door box 103 are not aligned with each other in a vehicle longitudinal direction depending on vehicle models, it is necessary to manufacture the different-shaped load receiving members 104 for every vehicle models. This may lead to increased manufacturing costs of the load receiving members 104.

Therefore, there is a need in the art to prevent a vehicle door from protruding into a vehicle cabin when a collision load is applied to the door from a lateral side thereof, and to reduce costs that are required for measures to prevent the door from protruding into the vehicle cabin.

SUMMARY OF THE INVENTION

In one aspect of the present invention, a vehicle body structure is provided. In the vehicle body structure, a collision load applied to one of vehicle doors from a lateral side thereof is received by a load receiving member of a body via an impact beam and a door box of the door and is transmitted from the load receiving member to a cross member. The load receiving member includes a load receiving pipe that is formed as a linear tubular body disposed between the right and left doors so as to extend in a vehicle widthwise direction and is capable of transmitting the collision load from the door box of one of the doors to a door box of the other of the doors, and connecting portions that are capable of supporting the load receiving pipe at positions adjacent to the right and left doors and connecting the load receiving pipe to the cross member.

According to the aspect, the collision load applied to the load receiving member via the impact beam and the door box of the door is transmitted from the load receiving pipe to the cross member via the connecting portions, and at the same time, is transmitted to the door box of the opposite door via the load receiving pipe. That is, when the collision load is applied to the vehicle door from the lateral side thereof, the door is supported by the cross member via the load receiving pipe and the connecting portions, and at the same time, is supported by the opposite door via the load receiving pipe. Thus, the door can be restricted from protruding into a vehicle cabin.

Further, the collision load is distributed to a load component (a transmission load) that can be transmitted from the load receiving pipe to the cross member and can be received by the cross member, and a load component (an axial load) that can be axially applied to the load receiving pipe and can be received by the load receiving pipe and the opposite door. Thus, because the collision load is distributed, the load component (the transmission load) applied to the cross member can be reduced. As a result, it is possible to reduce reinforcement of the cross member for measures to prevent the door from protruding into the vehicle cabin.

Further, in the load receiving member, the load receiving pipe is connected to the cross member via the connecting portions. Therefore, the load receiving member can be previously prepared and can be attached to the cross member in subsequent processes. As a result, the load receiving member can be commoditized in different vehicle models.

Thus, it is possible to reduce costs that are required for measures to prevent the door from protruding into the vehicle cabin.

In another aspect of the present invention, each of axial end portions of the load receiving pipe has a cone shape that is flared toward a distal end thereof.

Therefore, a directional change of the collision load caused by height-variation of a vehicle can be effectively compensated.

In a further aspect of the present invention, the connecting portions are respectively independently disposed in one and the other sides in the vehicle widthwise direction. Each of the connecting portions includes an upper fixture portion to which the load receiving pipe is secured, and a lower fixture portion which is secured to the cross member. The lower fixture portion has a width greater than the upper fixture portion in the vehicle widthwise direction and is positioned inside of the upper fixture portion in the vehicle widthwise direction.

Therefore, each of the connecting portions can have an increased strength that is capable of axially supporting the load receiving pipe. As a result, the load receiving pipe cannot be easily moved axially by the collision load.

In a further aspect of the present invention, the door box has a receiving surface to which the impact beam subjected to the collision load can be pressed. The receiving surface has a hook-like projection that is capable of preventing the impact beam pressed to the receiving surface from being disengaged from the receiving surface.

Thus, the impact beam can be prevented from being disengaged from the receiving surface of the door box by impact of collision. Therefore, the collision load can be reliably transmitted to the door box.

In a further aspect of the present invention, the door box has a receiving surface to which the impact beam subjected to the collision load can be pressed. The receiving surface includes a front side inclined surface that is capable of transforming the collision load from the impact beam applied from diagonally before to a collision load which is directed in the vehicle widthwise direction, and a rear side inclined surface that is capable of transforming the collision load from the impact beam applied from diagonally behind to the collision load which is directed in the vehicle widthwise direction.

According to this structure, even when the collision load is applied to the receiving surface of the door box from diagonally before or diagonally behind via the impact beam as a result of deformation of, for example, the rear door by the collision, the collision load can be transformed to the collision load which is directed in the vehicle widthwise direction, so as to be efficiently transmitted to the load receiving pipe.

In a still further aspect of the present invention, the door box is attached to a door inner panel constituting the door while the door box is inserted into an opening formed in the door inner panel. The door box has a hook portion that is formed in an upper surface thereof and is capable of engaging a periphery of the opening of the door inner panel when the door box is subjected to the collision load and is displaced toward a vehicle cabin.

According to this structure, when the door box subjected to the collision load is displaced toward the vehicle cabin, the hook portion formed in the upper surface of the door box can engage the periphery of the opening of the door inner panel. Therefore, the door box can be prevented from rotating downwardly. As a result, an unfavorable condition in which the door box cannot contact the load receiving pipe can be avoided.

According to the present invention, it is possible to prevent a vehicle door from protruding into a vehicle cabin when a collision load is applied to the door from a lateral side thereof, and to reduce costs that is required for measures to prevent the door from protruding into the vehicle cabin.

BRIEF DESCRIPTION OF THE DRAWINGS

FIG. 10 (A) is a side view of the door box.

FIG. 10 (B) is an elevational view of the door box (a view which is viewed in the direction of arrows B-B in FIG. 10 (A).

FIG. 11 (A) is a side view of a door box in a modified form.

FIG. 11 (B) is an elevational view of the door box (a view which is viewed in the direction of arrows B-B in FIG. 11 (A).

FIG. 11 (C) is a plan view of the door box (a view which is viewed in the direction of arrows C-C in FIG. 11 (A).

DETAILED DESCRIPTION OF THE INVENTION

In the following, a vehicle body structure according to Embodiment 1 of the present invention is described with reference to the drawings.

Embodiment 1

Further, in the drawings, forward and rearward, rightward and leftward, and upward and downward respectively correspond to forward and rearward, rightward and leftward, and upward and downward of a vehicle.

<Regarding Outline of Vehicle Body Structure>

Figure 2:
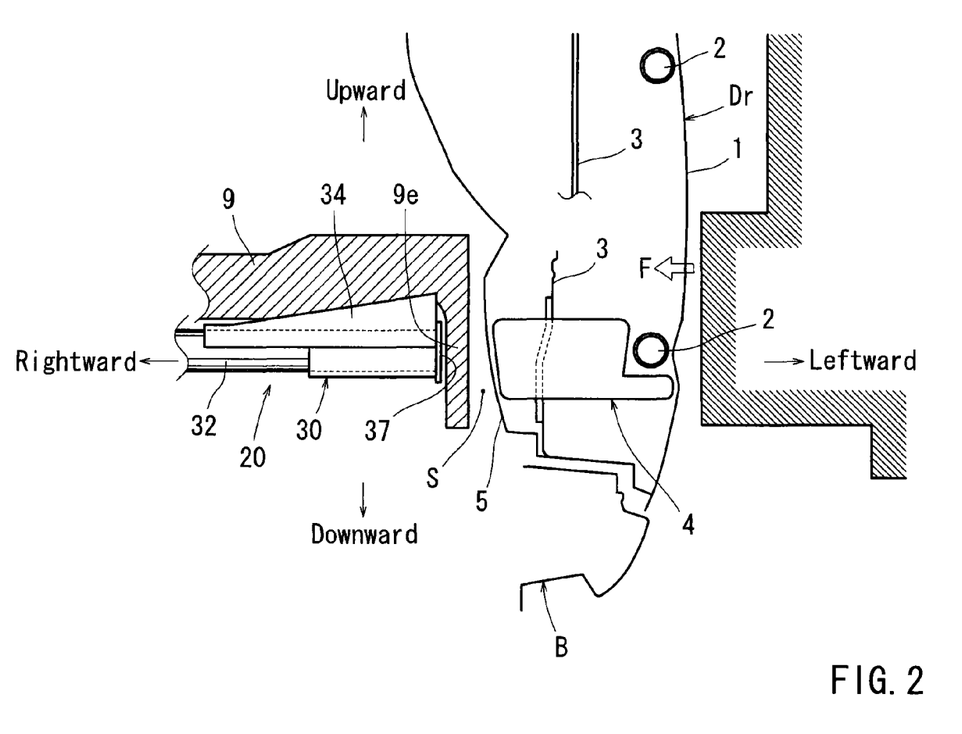
FIG. 2 is a vertical cross-sectional view of the vehicle body structure.

As shown in FIG. 2, a vehicle body structure according to the present embodiment is intended to restrict a vehicle rear door Dr from protruding into a vehicle cabin when a collision load F is applied to the rear door Dr from a lateral side thereof.

As shown in, for example, FIG. 2, the rear door Dr includes a door outer panel 1 and a door inner panel 3. Two impact beams 2 of high-tensile steel pipes are disposed between the panels 1 and 3, so as to extend rearward and forward. Further, a door box 4 is disposed between the door outer panel 1 and the door inner panel 3. The door box 4 is positioned to receive the collision load F from the lower impact beam 2. Further, the door box 4 is positioned such that a portion thereof can project toward a vehicle cabin side through the door inner panel 3. In addition, the door inner panel 3 and the door box 4 are covered by an interior panel 5 in the vehicle cabin side.

Figure 3:
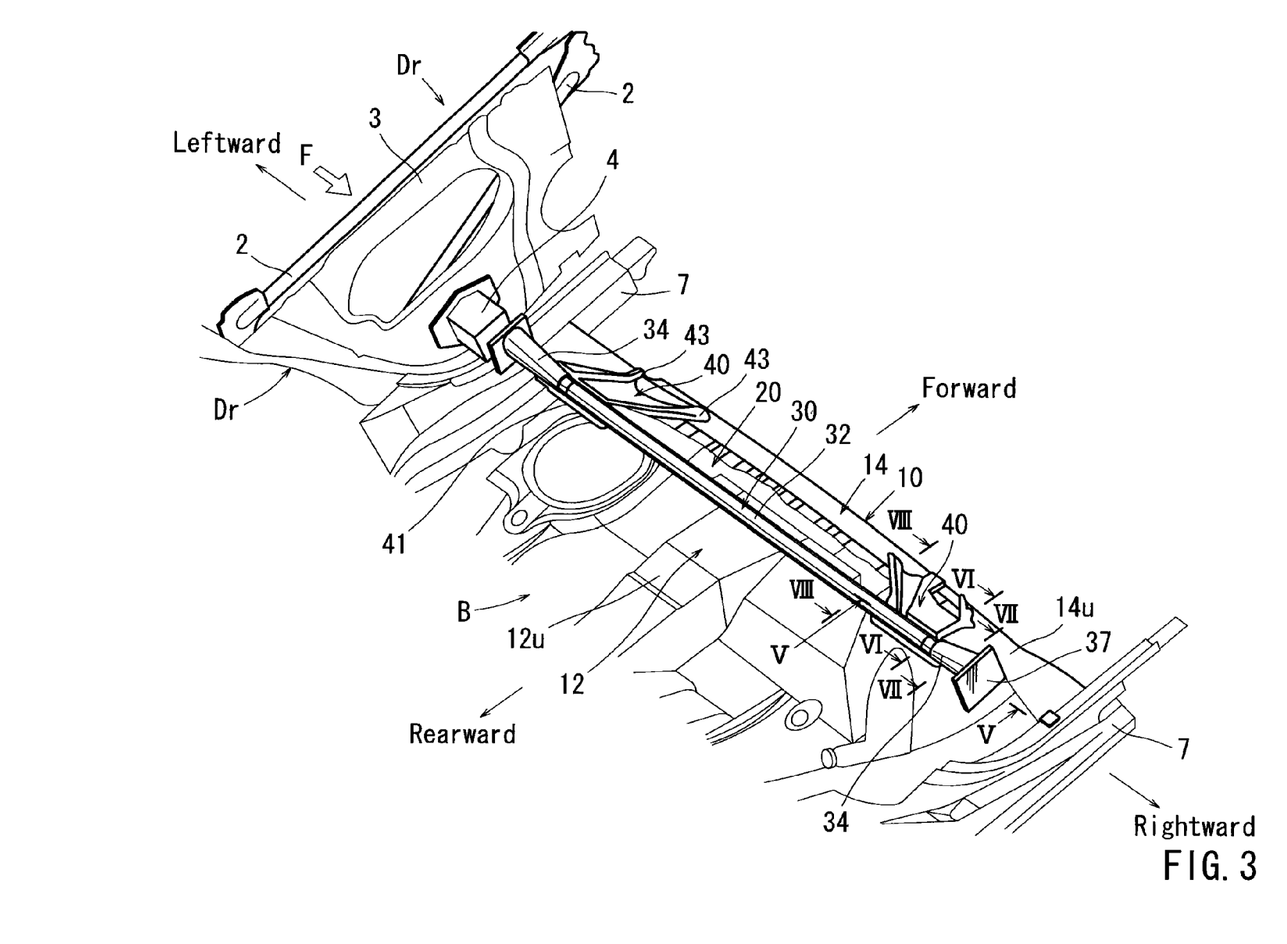
FIG. 3 is an overall perspective view of the vehicle body structure, which is viewed from behind.

In the vehicle body structure according to the present embodiment, as shown in, for example, FIG. 2 and FIG. 3, the collision load F is received by the impact beams 2 and the door box 4 of the rear door Dr (the left rear door in FIG. 2) and is transmitted to a load receiving member 20 provided to a body B side. The collision load F is then transmitted from the load receiving member 20 to a cross member 10 and a door box and other components (not shown) of a right rear door.

That is, the left rear door Dr described above is supported by the cross member 10 and the right rear door via the load receiving member 20 provided to the body B side, so as to be restricted from protruding into the vehicle cabin. Further, in FIG. 2, the cross member 10 is omitted.

<Regarding Load Receiving Member 20>

The load receiving member 20 is a component that is capable of receiving the collision load F transmitted from the door box 4 of the rear door Dr and transmitting the collision load F to the cross member 10 and the door box (not shown) of the opposite rear door. As shown in, for example, FIG. 1(A), the load receiving member 20 is composed of a tubular load receiving pipe 30 and a pair of connecting portions 40. The connecting portions 40 are capable of supporting both axial end portions of the load receiving pipe 30 and connecting the load receiving pipe 30 to the cross member 10.

Figure 4:
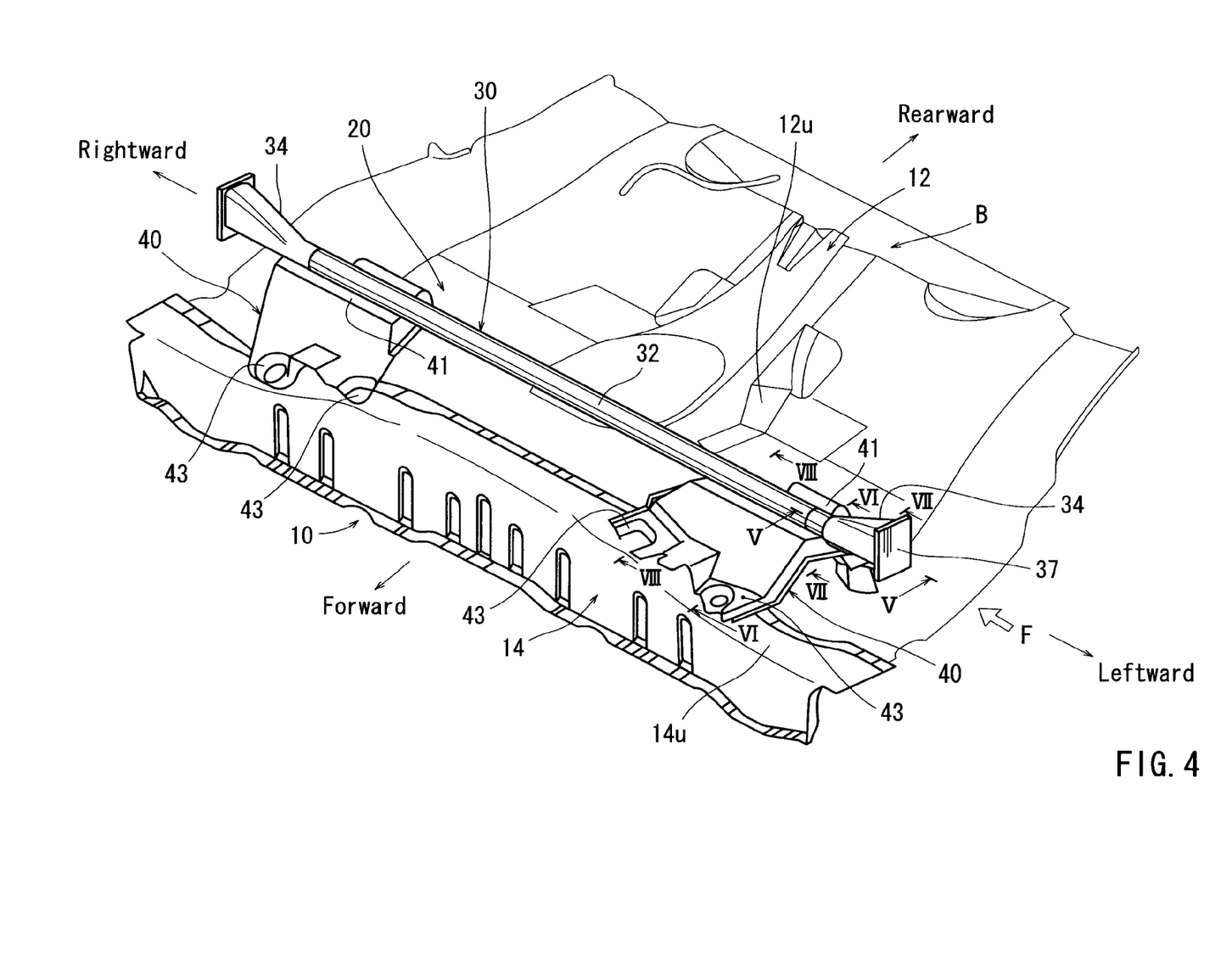
FIG. 4 is an overall perspective view of the vehicle body structure, which is viewed from before.

As shown in FIG. 3 and FIG. 4, the load receiving pipe 30 is disposed between the right and left rear doors Dr so as to extend in a vehicle widthwise direction. The load receiving pipe 30 has a length that is slightly smaller than the distance between the right and left rear doors Dr. Therefore, as shown in FIG. 2, in a condition in which the load receiving pipe 30 is positioned between the right and left rear doors Dr, a space S is formed between an end surface of the load receiving pipe 30 and the interior panel 5 of the rear door Dr.

Figure 1A:
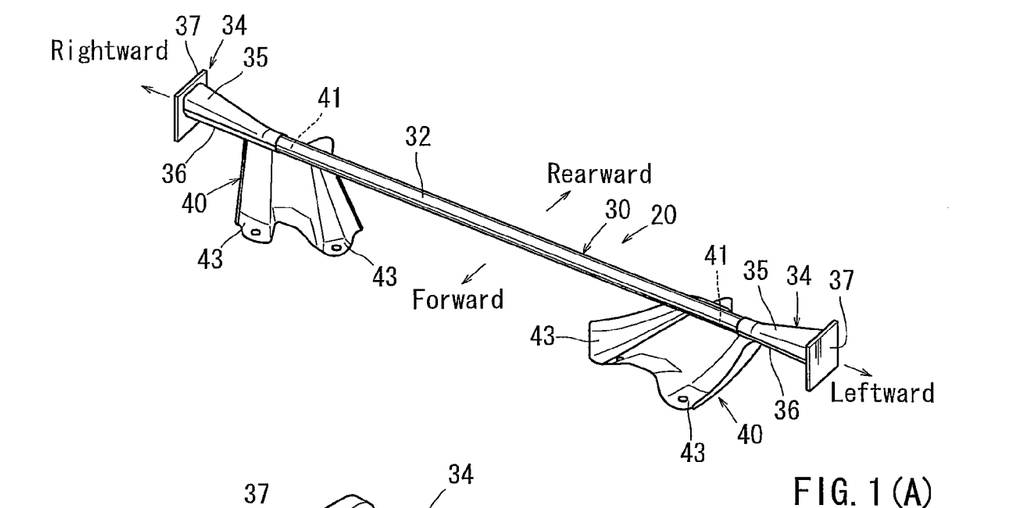
FIG. 1(A) is a perspective view of a load receiving member used in a vehicle body structure according to Embodiment 1 of the present invention.
Figure 1B:
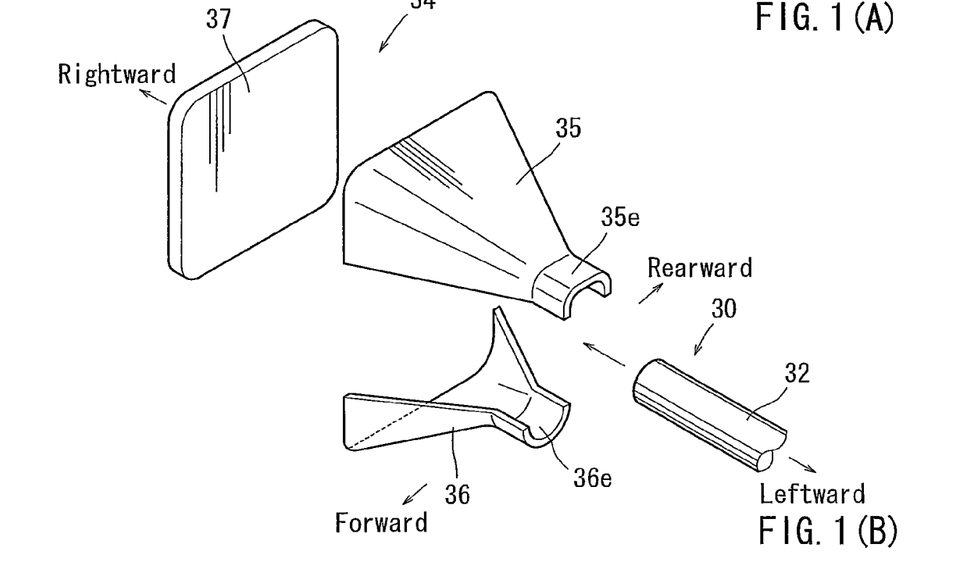
FIG. 1(B) is an exploded perspective view of an end portion of a load receiving pipe of the load receiving member.

As shown in FIGS. 1 (A) and 1 (B), the load receiving pipe 30 is composed of a straight pipe portion 32 of a desired length of pipe, and flared portions 34 that are disposed in both ends of the straight pipe portion 32. Further, for example, a steel pipe of 30 mm in diameter and 2 mm in thickness is used as the straight pipe portion 32.

Figure 5:
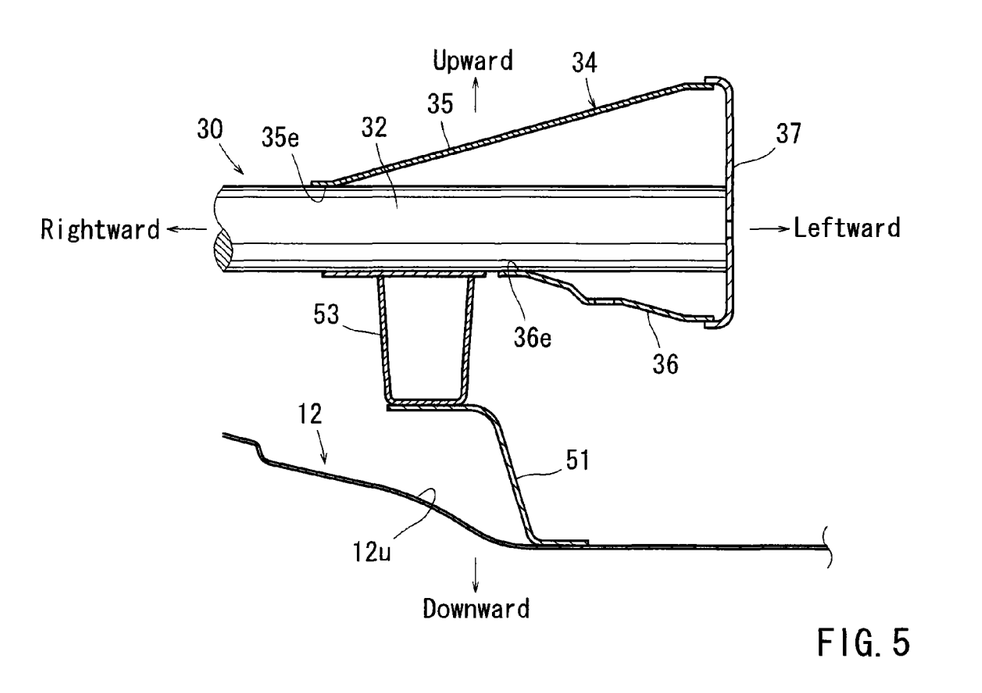
FIG. 5 is a cross-sectional view of a portion V in FIG. 3 and FIG. 4, which is viewed in the direction of arrows.

As shown in, for example, FIG. 1(B) and FIG. 5, each of the flared portions 34 has a cone shape that is flared toward a distal end thereof and has a rectangular shape in cross section. The flared portion 34 is constructed of an upper flared element 35 having a U-shape in cross section, a lower flared element 36 having a U-shape in cross section, and a rectangular vertical flat plate 37. The upper flared element 35 and the lower flared element 36 respectively constitute an upper half and a lower half of the flared portion 34. Further, the vertical flat plate 37 constitutes a distal end surface of the flared portion 34 (the end surface of the load receiving pipe 30). Further, half-cylindrical portions 35e and 36e are respectively formed in proximal ends (ends opposite to the distal end surface) of the upper flared element 35 and the lower flared element 36, so as to receive the straight pipe portion 32 between the half-cylindrical portions 35e and 36e. As shown in FIG. 5, the straight pipe portion 32 is inserted into the flared portion 34 until an end surface thereof contacts an inner surface of the vertical flat plate 37. In this condition, an outer circumferential surface of the straight pipe portion 32 is bonded to the half-cylindrical portions 35e and 36e of the upper flared element 35 and the lower flared element 36 by welding. Further, the flared portion 34 is formed of, for example, a steel plate having a thickness of about 2 mm.

Figure 6:
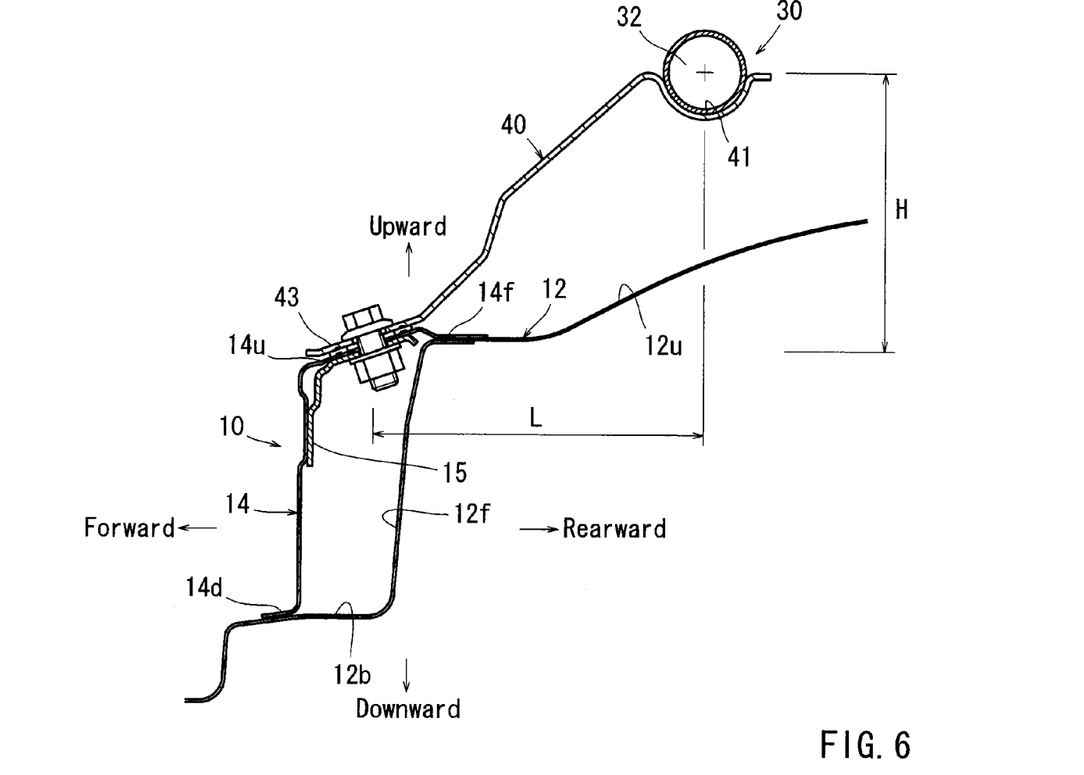
FIG. 6 is a cross-sectional view of a portion VI in FIG. 3 and FIG. 4, which is viewed in the direction of arrows.

As shown in FIG. 1(A) and FIG. 6 (a cross-sectional view of a portion VI in FIGS. 3 and 4, which is viewed in the direction of arrows), each of the connecting portions 40 is formed as a substantially mountain-shaped plate body, and has a half-cylindrical recessed portion 41 that is formed in a ridge portion thereof. The recessed portion 41 of the connecting portion 40 is a portion that is capable of supporting the straight pipe portion 32 positioned adjacent to the flared portion 34 of the load receiving pipe 30 from below. The recessed portion 41 is bonded to the straight pipe portion 32 by welding or other such methods.

Further, as shown in FIG. 1(B) and FIG. 6, bolt receiving portions 43 are formed in the connecting portion 40. The bolt receiving portions 43 are formed in a foot portion of the substantially mountain-shaped plate body, so as to be positioned in two portions in the vehicle widthwise direction. The bolt receiving portions 43 of the connecting portion 40 are secured to an upper surface 14u of the cross member 10 by bolting. Further, the connecting portion 40 is formed of, for example, a steel plate having a thickness of about 2 mm.

As shown in FIG. 6, the recessed portion 41 of the connecting portion 40 is positioned behind the bolt receiving portions 43 at a constant distance L and above the bolt receiving portions 43 at a constant distance H. That is, when the bolt receiving portions 43 of the connecting portion 40 are secured to the upper surface 14u of the cross member 10, the load receiving pipe 30 is positioned behind the cross member 10 at the distance L and above the cross member 10 at the distance H. Further, the distance L and the distance H are determined such that the load receiving pipe 30 is coincide with the door box 4 of the rear door Dr in vehicle longitudinal and vertical directions.

Further, a distance between the bolt receiving portions 43 of the connecting portion 40 in the vehicle widthwise direction is specified to be greater than the axial length of the recessed portion 41. In addition, the bolt receiving portions 43 are positioned inside of the recessed portion 41 in the vehicle widthwise direction.

The ridge portion of the connecting portion 40 having the recessed portion 41 corresponds to an upper fixture portion. Conversely, the foot portion of the connecting portion 40 having the bolt receiving portions 43 corresponds to a lower fixture portion.

<Regarding Cross Member 10>

Figure 8:
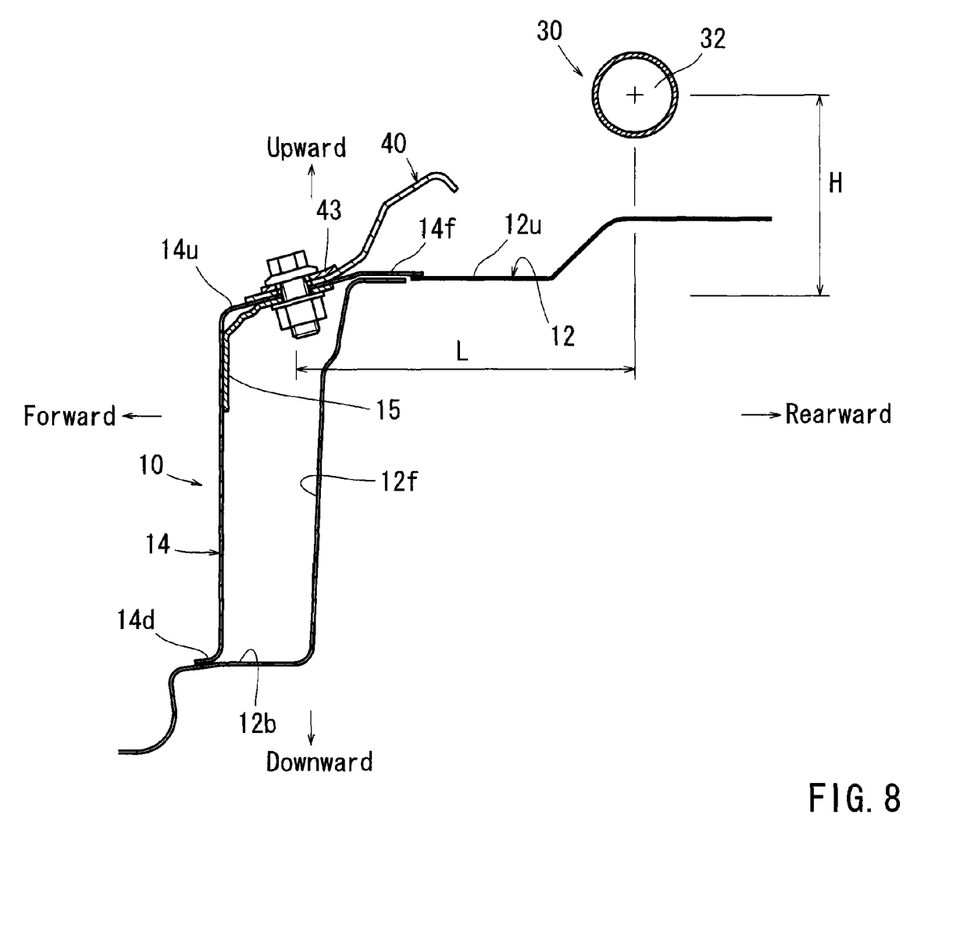
FIG. 8 is a cross-sectional view of a portion VIII in FIG. 3 and FIG. 4, which is viewed in the direction of arrows.

As shown in FIG. 6 and FIG. 8 (a cross-sectional view of a portion VIII in FIGS. 3 and 4, which is viewed in the direction of arrows), the cross member 10 to which the bolt receiving portions 43 of the connecting portions 40 are bolted is constructed of a vehicle cabin rear floor 12 and a front formed panel 14. The vehicle cabin rear floor 12 is a step-like portion formed in a rear portion of the vehicle cabin. Conversely, the front formed panel 14 covers a vertical portion 12f of the vehicle cabin rear floor 12 and has a substantially reversed L-shape in cross section.

As shown in FIG. 6 and FIG. 8, the front formed panel 14 includes an upper flange 14f formed in an upper rear end periphery thereof and a lower flange 14d formed in a lower front end periphery thereof. The upper flange 14f of the front formed panel 14 is bonded to an upper surface 12u of the vehicle cabin rear floor 12 by, for example, welding. Conversely, the lower flange 14d of the front formed panel 14 is bonded to a lower surface 12b of the vehicle cabin rear floor 12 by, for example, welding. Thus, the closed box-like hollow cross member 10 is formed. The cross member 10 has a substantially rectangular cross-sectional shape and extends horizontally in the vehicle widthwise direction. Both end portions of the cross member 10 are connected to rockers 7 (FIG. 3) that are disposed in both sides of the body B.

Reinforcement plates 15 are attached to the front formed panel 14 constituting the cross member 10. The reinforcement plates 15 are positioned on rear surfaces of portions to which the bolt receiving portions 43 of the connecting portions 40 are bolted.

<Regarding Vehicle Cabin Rear Floor 12>

The load receiving member 20 is attached to the upper surface 12u of the vehicle cabin rear floor 12 and the upper surface 14u of the cross member 10. Thereafter, a rear seat 9 (FIG. 2) is disposed thereon.

Figure 7:
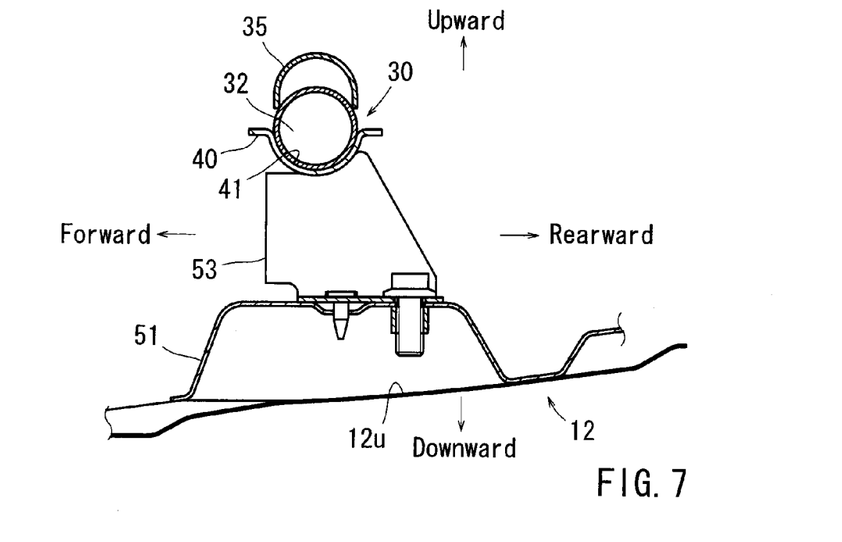
FIG. 7 is a cross-sectional view of a portion VII in FIG. 3 and FIG. 4, which is viewed in the direction of arrows.

As described above, because the load receiving pipe 30 of the load receiving member 20 is positioned behind the cross member 10 at the distance L and above the cross member 10 at the distance H, the load receiving pipe 30 is positioned above the upper surface 12u of the vehicle cabin rear floor 12. Consequently, as shown in FIG. 5 and FIG. 7, support bases 51 and support cradles 53 are disposed on the upper surface 12u of the vehicle cabin rear floor 12 in order to support the straight pipe portion 32 of the load receiving pipe 30. The support bases 51 and the support cradles 53 are positioned directly below the load receiving pipe 30 and closer to the recessed portions 41 of the connecting portions 40. Further, FIG. 5 is a cross-sectional view of a portion V in FIG. 3 and FIG. 4, which is viewed in the direction of arrows. FIG. 7 is a cross-sectional view of a portion VII in FIG. 3 and FIG. 4, which is viewed in the direction of arrows.

<Regarding Attaching Operation of Load Receiving Member 20>

As shown in FIG. 1(A), the load receiving member 20 is attached to the body B while the connecting portions 40 are connected to both end portions of the load receiving pipe 30. In other words, the bolt receiving portions 43 of each of the connecting portions 40 are bolted on the upper surface 14u of the cross member 10, so that the load receiving member 20 can be connected to the cross member 10. Further, the straight pipe portion 32 of the load receiving pipe 30 is supported on the support bases 51 and the support cradles 53 disposed on the upper surface 12u of the vehicle cabin rear floor 12. The straight pipe portion 32 is secured to the support cradles 53 by, for example, welding. Thus, as shown in FIG. 3 and FIG. 4, an attaching operation of the load receiving member 20 to the body B is completed.

Next, the rear seat 9 is disposed on the upper surface 12u of the vehicle cabin rear floor 12. As a result, as shown in FIG. 2, the load receiving member 20 can be covered by the rear seat 9. At this time, the end surfaces of the load receiving pipe 30 of the load receiving member 20 can be covered by side wall portions 9e of the rear seat 9.

<Regarding Function of Vehicle Body Structure According to Present Embodiment>

As shown in FIG. 2, when the collision load F is applied to the vehicle left rear door Dr having the vehicle body structure according to the present embodiment from a left-lateral side thereof, the collision load F is transmitted to the door box 4 via the impact beams 2 of the rear door Dr. The collision load F is then transmitted from the door box 4 to a left end surface of the load receiving pipe 30 of the load receiving member 20. Further, because the flared portion 34 having the cone shape is disposed in the each end portion of the load receiving pipe 30, a directional change of the collision load F can be effectively compensated.

The collision load F applied to the left end surface of the load receiving pipe 30 axially presses the load receiving pipe 30 and is transmitted to the cross member 10 via both of the connecting portions 40. Further, the collision load F axially presses the load receiving pipe 30 and is transmitted to the door box and impact beams of the right rear door Dr (not shown). That is, the door box 4 and other components of the left rear door Dr can be supported by the both end portions of the cross member 10 via the load receiving pipe 30 and the connecting portions 40, and at the same time, can be supported by the door box and other components of the right rear door Dr (not shown) via the load receiving pipe 30. Thus, as shown in FIG. 2, even when the collision load F is applied to the vehicle left rear door Dr from the left-lateral side thereof, the left rear door Dr can be restricted from protruding into the vehicle cabin.

<Regarding Advantages of Vehicle Body Structure>

In the vehicle body structure according to the present embodiment, the collision load F is distributed to a load component (a transmission load) that can be transmitted from the load receiving pipe 30 to the cross member 10 via the connecting portions 40 and can be received by the cross member 10, and a load component (an axial load) that can be axially applied to the load receiving pipe 30 and can be received by the load receiving pipe 30 and the opposite (right) door. Thus, because the collision load F is distributed, the load component (the transmission load) applied to the cross member 10 can be reduced. As a result, it is possible to reduce reinforcement of the cross member 10 for measures to prevent the door from protruding into the vehicle cabin.

Further, in the load receiving member 20, the load receiving pipe 30 is connected to the cross member 10 via the connecting portions 40. Therefore, the load receiving member 20 can be previously prepared, so as to be attached to the cross member 10 in subsequent processes. As a result, the load receiving member 20 can be commoditized in different vehicle models.

Thus, it is possible to reduce costs that are required for measures to prevent the rear door Dr from protruding into the vehicle cabin.

Further, because each of the axial end portions of the load receiving pipe 30 has a cone shape that is flared toward a distal end thereof, the directional change of the collision load F caused by height-variation of the vehicle can be effectively compensated.

Further, each of the connecting portions 40 includes the upper fixture portion (the ridge portion having the recessed portion 41) to which the load receiving pipe 30 is secured, and the lower fixture portion (the foot portion having the bolt receiving portions 43) which is secured to the cross member 10. The lower fixture portion has a width greater than the upper fixture portion in the vehicle widthwise direction. In addition, the lower fixture portion is positioned inside of the upper fixture portion in the vehicle widthwise direction. Therefore, the connecting portion 40 can have an increased strength that is capable of axially supporting the load receiving pipe 30. As a result, the load receiving pipe 30 cannot be easily moved axially by the collision load F.

<Modified Forms>

The present invention is not limited to the embodiment described above and the invention can be modified without departing from the scope thereof. For example, in this embodiment, the axial end portions of the load receiving pipe 30 are supported by a pair of connecting portions 40. However, the number of the connecting portions 40 can be increased, so as to additionally support the load receiving pipe 30, for example, a central portion thereof, by the connecting portion 40.

Further, in this embodiment, each of the flared portions 34 of the load receiving pipe 30 has a cone shape and has a rectangular shape in cross section. However, each of the flared portions 34 may have various shapes in cross section Further, in this embodiment, the bolt receiving portions 43 of the connecting portions 40 are bolted to the cross member 10. However, the connecting portions can be secured thereto by, for example, welding.

In the following, a vehicle body structure according to Embodiment 2 of the present invention is described with reference to the drawings.

Embodiment 2

In the vehicle body structure according to the present embodiment, the door box 4 used in the vehicle body structure according to Embodiment 1 is modified. Remaining structures thereof are identical with the vehicle body structure according to Embodiment 1. Therefore, the same elements as the vehicle body structure according to Embodiment 1 will be identified by the same reference numerals and a detailed description of such elements will be omitted.

Figure 9:
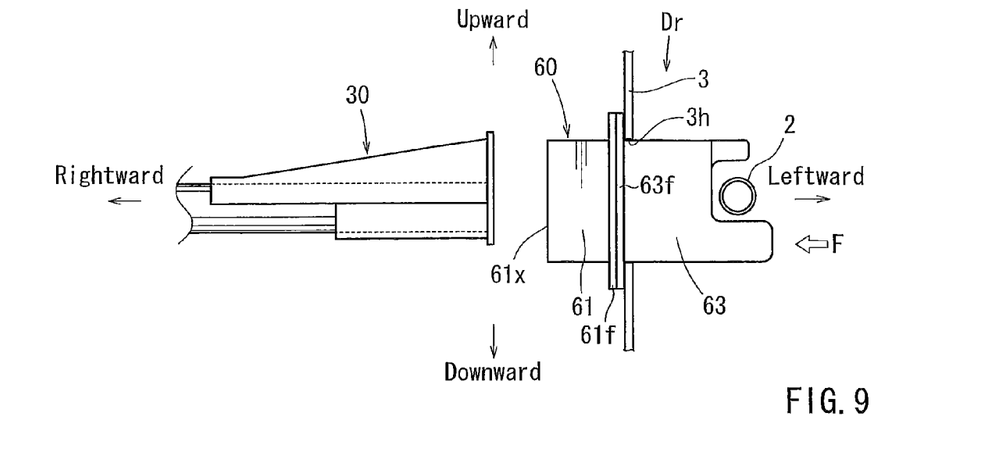
FIG. 9 is a side view of a door box and a load receiving pipe used in a vehicle body structure according to Embodiment 2 of the present invention, which illustrates a positional relation therebetween.
Figure 10A:
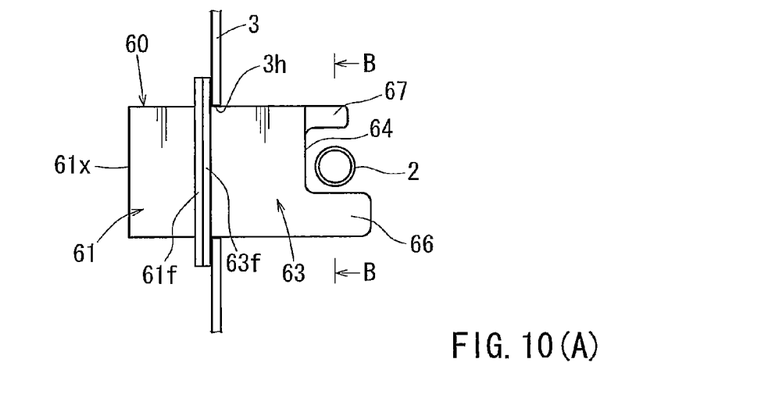

The door box 60 is a box-shaped member that is capable transmitting the collision load F applied from the impact beams 2 to the load receiving pipe 30. As shown in FIGS. 9 and 10(A), the door box 60 includes a vehicle cabin-side box 61 that projects toward the vehicle cabin side through the door inner panel 3, and an inside box 63 that is positioned inside of the rear door Dr. The vehicle cabin-side box 61 and the inside box 63 are respectively formed as box-shaped members having openings. The vehicle cabin-side box 61 and the inside box 63 respectively have flange portions 61f and 63f that are formed along peripheries of the openings. The flange portion 61f of the vehicle cabin-side box 61 and the flange portion 63f of the inside box 63 are bonded to each other, thereby forming the door box 60. Further, the inside box 63 is inserted into an opening 3h formed in the door inner panel 3 and the flange portions 61f and 63f are bolted to the door inner panel 3 along a periphery of the opening 3h. Thus, the door box 60 is secured to the door inner panel 3.

The inside box 63 of the door box 60 has a receiving surface 64 to which the impact beam 2 is pressed when the collision load F is applied to the rear door Dr. The receiving surface 64 is formed in a distal end side (a side opposite to the flange portion 63f) of the inside box 63. Further, the receiving surface 64 has a longitudinally extending rib 66 that is formed in a lower portion thereof. Therefore, the impact beam 2 can be prevented from being disengaged from the receiving surface 64 of the door box 60 downwardly by impact of collision. Further, the receiving surface 64 of the door box 60 has a hook-like projection 67 that is formed in an upper portion thereof, so as to prevent the impact beam 2 from being disengaged from the receiving surface 64 upwardly.

Thus, due to the effects of the rib 66 and the projection 67, the impact beam 2 can be prevented from being disengaged from the receiving surface 64 of the door box 60 by the impact of collision. Therefore, the collision load F can be reliably transmitted from the impact beam 2 to the door box 60.

Further, the vehicle cabin-side box 61 of the door box 60 has a contact surface 61x which is pressed to the load receiving pipe 30 when the collision load F is applied to the door box 60. The contact surface 61x is formed in a distal end side (a side opposite to the flange portion 61f) of the vehicle cabin-side box 61.

<Modified Forms>

The present invention is not limited to the embodiment described above and the invention can be modified without departing from the scope thereof. For example, in this embodiment, the receiving surface 64 is formed as a flattened surface. However, as the plan view of FIG. 11(C), the receiving surface 64 can be formed as an angled surface having a front side inclined surface 64x that is directed diagonally forwardly and a rear side inclined surface 64y that is directed diagonally rearwardly. According to this structure, even when the impact beam 2 collides against the receiving surface 64 of the door box 60 from diagonally before or diagonally behind as a result of deformation of, for example, the rear door Dr, the collision load F applied from diagonally can be transformed to a collision load Fw which is directed in the vehicle widthwise direction, so as to be efficiently transmitted to the load receiving pipe 30.

Further, as shown in, for example, FIG. 11(A), the inside box 63 of the door box 60 has a hook portion 69 that is formed in an upper surface 63u thereof and is capable of engaging the periphery of the opening 3h of the door inner panel 3. According to this structure, when the door box 60 subjected to the collision load F is displaced toward the vehicle cabin, the hook portion 69 formed in the upper surface 63u of the door box 60 can engage the periphery of the opening 3h of the door inner panel 3. Therefore, the door box 60 subjected to the collision load F can be prevented from rotating downwardly. As a result, an unfavorable condition in which the door box 60 cannot contact the load receiving pipe 30 can be avoided.

Figure 10B:
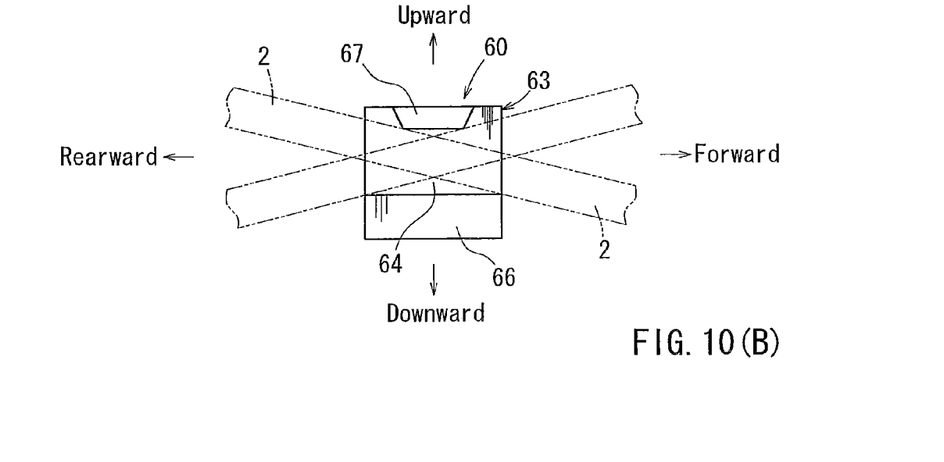
Figure 11:
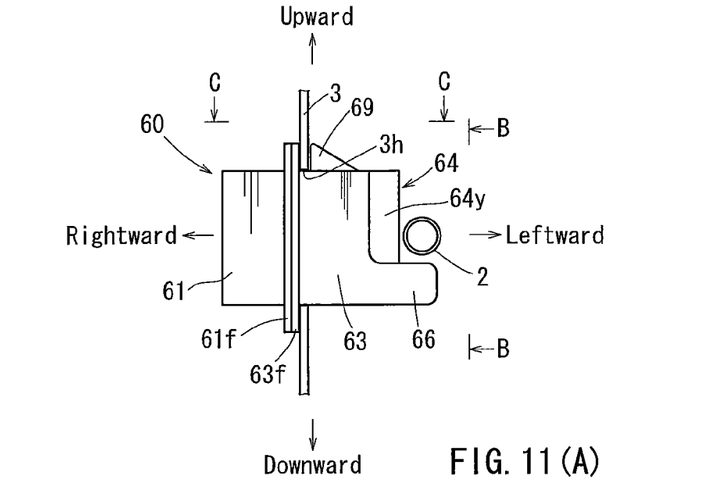

Further, the door box 60 shown in FIGS. 11 (A) to 11 (C) can have the hook-like projection 67 shown in FIGS. 10 (A) and 10 (B) that is formed in the upper portion of the receiving surface 64.

The invention claimed is:

1. A vehicle body structure in which a collision load applied to one of vehicle doors from a lateral side thereof is received by a load receiving member of a body via an impact beam and a door box of the door and is transmitted from the load receiving member to a cross member, the load receiving member comprising:
a load receiving pipe that is formed as a linear tubular body disposed between the right and left doors so as to extend in a vehicle widthwise direction and is capable of transmitting the collision load from the door box of one of the doors to a door box of the other of the doors; and
connecting portions that are capable of supporting the load receiving pipe at positions adjacent to the right and left doors and connecting the load receiving pipe to the cross member,
wherein the door box has a receiving surface to which the impact beam subjected to the collision load can be pressed,
wherein the receiving surface has a hook-like projection that is capable of preventing the impact beam pressed to the receiving surface from being disengaged from the receiving surface,
wherein the receiving surface includes a front side inclined surface that is capable of transforming the collision load from the impact beam applied diagonally from a forward direction to a collision load which is directed in the vehicle widthwise direction, and a rear side inclined surface that is capable of transforming the collision load from the impact beam applied diagonally from a rearward direction to the collision load which is directed in the vehicle widthwise direction,
wherein the door box is attached to a door inner panel of the door while the door box is inserted into an opening formed in the door inner panel, and
wherein the door box has a hook portion that is formed in an upper surface thereof and is capable of engaging a periphery of the opening of the door inner panel when the door box is subjected to the collision load and is displaced toward a vehicle cabin.

2. The vehicle body structure as defined in claim 1, wherein each of axial end portions of the load receiving pipe has a cone shape that is flared toward a distal end thereof.

3. A vehicle body structure in which a collision load applied to one of vehicle doors from a lateral side thereof is received by a load receiving member of a body via an impact beam and a door box of the door and is transmitted from the load receiving member to a cross member, the load receiving member comprising:
a load receiving pipe that is formed as a linear tubular body disposed between the right and left doors so as to extend in a vehicle widthwise direction and is capable of transmitting the collision load from the door box of one of the doors to a door box of the other of the doors; and connecting portions that are capable of supporting the load receiving pipe at positions adjacent to the right and left doors and connecting the load receiving pipe to the cross member, wherein the door box has a receiving surface to which the impact beam subjected to the collision load can be pressed, wherein the receiving surface has a hook-like projection that is capable of preventing the impact beam pressed to the receiving surface from being disengaged from the receiving surface, wherein the receiving surface includes a front side inclined surface that is capable of transforming the collision load from the impact beam applied diagonally from a forward direction to a collision load which is directed in the vehicle widthwise direction, and a rear side inclined surface that is capable of transforming the collision load from the impact beam applied diagonally from a rearward direction to the collision load which is directed in the vehicle widthwise direction, wherein the connecting portions are respectively independently disposed in one and the other sides in the vehicle widthwise direction, wherein each of the connecting portions includes an upper fixture portion to which the load receiving pipe is secured, and a lower fixture portion which is secured to the cross member, and wherein the lower fixture portion has a width greater than the upper fixture portion in the vehicle widthwise direction and is positioned inside of the upper fixture portion in the vehicle widthwise direction.

* * * * *